United States Patent [19]

Schaareman

[11] Patent Number: 5,316,492
[45] Date of Patent: May 31, 1994

[54] PLUG-IN CONNECTION FOR HIGH-VOLTAGE PLASTIC CABLE

[75] Inventor: Jacobus M. Schaareman, Delft, Netherlands

[73] Assignee: NKF Kabel B.V., Mc Delft, Netherlands

[21] Appl. No.: 772,357

[22] PCT Filed: May 2, 1990

[86] PCT No.: PCT/NL90/00060
§ 371 Date: Nov. 22, 1991
§ 102(e) Date: Nov. 22, 1991

[87] PCT Pub. No.: WO90/13933
PCT Pub. Date: Nov. 15, 1990

[30] Foreign Application Priority Data

May 3, 1989 [NL] Netherlands .................. 8901138

[51] Int. Cl.$^5$ ........................................ H01R 13/52
[52] U.S. Cl. ................... 439/206; 174/73.1; 439/796; 439/818
[58] Field of Search ........... 174/73.1, 84 R, 84 S; 439/723, 724, 796, 818, 921, 88, 89, 206

[56] References Cited

U.S. PATENT DOCUMENTS

| | | | |
|---|---|---|---|
| 2,077,737 | 4/1937 | Brandt . | |
| 2,967,901 | 1/1961 | Priaroggia | 174/73.1 |
| 3,612,746 | 10/1971 | Sankey | 174/73.1 |
| 3,622,688 | 11/1971 | Link | 174/73.1 |
| 3,678,432 | 7/1972 | Bolivar | 439/206 |
| 3,784,729 | 1/1974 | Davis et al. | 174/73.1 |
| 4,074,926 | 2/1978 | Broad | 174/73.1 |

FOREIGN PATENT DOCUMENTS

| | | |
|---|---|---|
| 0044726 | 1/1982 | European Pat. Off. . |
| 0149032 | 7/1985 | European Pat. Off. . |
| 1665222 | 7/1975 | Fed. Rep. of Germany . |
| 7928015 | 7/1980 | Fed. Rep. of Germany . |
| 3124060 | 1/1983 | Fed. Rep. of Germany . |
| 2141752 | 1/1973 | France . |
| 509513 | 8/1971 | Switzerland . |
| 2158661 | 11/1985 | United Kingdom . |

Primary Examiner—Neil Abrams
Attorney, Agent, or Firm—Handal & Morofsky

[57] ABSTRACT

Plug-in connection in particular a sleeve for high-voltage plastic cables, comprising an electrical insulator fitting closely onto cable ends (1), said cable insulator having an electrically conducting stress-controlling body (8) for screening cable conductor connecting elements received herein, an insulating body (9) surrounding the stress-controlling body (8) and an electrically conducting sheath (10) surrounding the insulating body (9) completely or partially. The insulator is provided with axial close-fitting passages (11) merging into the space in the stress-controlling body (9) for the cable conductor connecting elements. According to the present invention the cable conductor connecting elements comprise at least one plug part (14) and at least one counter-plug (15) part and means for mutually locking the plug part (14) and the counter-plug part (15).

32 Claims, 11 Drawing Sheets

PLUG-IN CONNECTION FOR HIGH-VOLTAGE PLASTIC CABLE

BACKGROUND OF THE INVENTION

The invention relates to a joint for high-voltage and very high-voltage plastic cable having a conductor and at least one surrounding insulating sheath, this joint comprising an elastic stretchable electrical sleeve insulator having an electrically conducting stress-controlling body, for screening cable conductor connecting elements received in an inner space defined by the stress-controlling body, an insulating body surrounding the stress-controlling body, and an electrically conducting sheath surrounding completely or partially the insulating body, the sleeve insulator having at least one axial close-fitting passage merging into the space in the stress-controlling body for receiving a cable end.

A joint of this type is used for connecting a high-voltage and a very high-voltage plastic cable to at least one other cable, a high-voltage switch or a high-voltage transformer, and is known from DE-B-1,665,222.

In connections of high-voltage plastic cables, in particular in high-voltage sleeves, it is important that they can be assembled in the field rapidly and, if possible, by untrained personnel. A sleeve connection having preferably a minimum number of components, which have all been completely inspected electrically beforehand and which can be placed rapidly in each other with a limited number of man-independent operations, offers the maximum operating reliability and safety. In connections of plastic cables for very high voltages it is very important that, after assembly of the connection, the mutual positions of the components are precise so that the necessary electrical insulation values are complied with. Furthermore, the cost price must be kept low.

In the case of joints for high-voltage and very high-voltage plastic cable according to the state of the art, i.e. DE-B-1,665,222 mentioned above, the cable conductor connecting elements are made up as a connecting clamp for fixedly connecting the cable conductors. Assembly in the field is time-consuming and man-dependent and a good inspection of the electrical characteristics of the connection is not readily possible and only to a limited extent, and the operating reliability of these connections is less well guaranteed.

SUMMARY OF THE INVENTION

The invention now has for its object to provide a joint for a high-voltage and very high-voltage cable insulated with PE, XLPE or EPR for mains voltages of 50,000 volts up to and including 400,000 volts and possibly higher, which joint complies with the requirements described above.

According to the invention this is achieved in that electrical conductor connecting elements designed as a plug-in connector are used, comprising at least one mating plug part and counter-plug part of electrical conducting material, and in that means are provided for mechanically locking the connector parts with respect to each other.

Use is made, according to the invention, of a prefabricated and electrically inspected sleeve insulator which is known, inter alia, from DE-B-1,665,222 and preprocessed cable ends, which have also been electrically inspected.

By fitting a connector part to the cable end under optimum working conditions in the factory and checking them beforehand in combination with the prefabricated sleeve insulator at a voltage level of two to three times the operating voltage, the quality of pre-processed cable ends and the sleeve insulator is maximized before assembly in the field. An electrically well conducting and mechanically strong connection is brought about for the high-voltage plastic cable to be connected, the cable end being precisely positioned with respect to the sleeve insulator, as a result of which the required insulation value is insured.

Since any contaminants on the cable ends are pushed off by the edge of the sleeve insulators during the plugging-in procedure, no specific requirements have to be imposed on the circumstances during the assembly of the connection in order to achieve a good result, with regard to insulation value.

It should be noticed that connector joints for use with low or medium voltage cable, i.e. voltages up to about 50 kV, are known in the art.

EP-A1-0,044,726 discloses a detachable and fluid-tight electrical cable termination for fluid-filled cables. Although a plug-and-socket connection is shown, it contains no suggestion whatsoever for its use as a plug-in connector for a joint or termination for plastic cable at voltages between 50 and 400 kV or even higher, according to the present invention. The limitation to low or medium voltages is obvious from the too many unshielded sharp edges of the insulator and end-fitting shown.

FR-A-2,141,752 discloses a fluid-filled cable joint. The attention is focussed here on the conductor connection means having a specific construction. No locking means being provided. This is obviously not a plug-in joint and the disadvantages, as mentioned above, when using in the field will be met here. This joint is intended for use with cable for a voltage range of about 20 kV.

US-A-2,077,737 discloses a prefabricated insulator for jointing fluid-filled cable for power transmission, i.e. voltage levels up to about 20 kV.

These publications all relate to fluid-filled cables and fluid-filled plug-in connections, for which the insulating medium is oil surrounding the connector and conductor connecting elements. Oil as an insulating medium allows one to use loosely dimensioned insulating sleeves, presenting no difficulties as regards friction and plugging in of cable ends. The loose space in these sleeves is filled within insulating oil after the cable ends have been plugged in.

DE-A-3,124,060 and DE-U-7,928,015 disclose particular electrical connection sleeves for plastic cable ends. From the description and the embodiments shown, it is obvious that these devices are not intended to be used with voltages above 30 kV. There are too many unshielded sharp edges which would certainly damage the joint when using it for the high voltage range according to the present application.

GB-A-2,158,661 discloses a joint for plastic cable in hostile environments, for voltages up to 2,5 kV.

Plastic cables for such low voltages can be bent easily and, compared to high-voltage plastic cable, require a less thick insulation sheath and are accordingly much less in weight, approximately 1–5 kg/m for Al-conductors and 5–8 kg/m for Cu-conductors. It will be apparent that these low and medium voltage range plastic cables are easier to handle than the heavy and stiff plastic cables for the voltage range which is the object of the present invention. The weight of these high-voltage plastic cables is typically in the range of 25 to 40 kg/m, dependent on their diameter.

Because of their massive homogeneous insulation sheath, high voltage plastic cable has a much greater stiffness compared to oil-filled cable for the same voltage range. Instead of a loosely dimensioned sleeve used for fluid-filled cables, a sleeve for a plastic high-voltage and very high-voltage cable must have axial closed fitting passages, in order to fulfil the insulation requirements.

It is this different in handling of low and medium voltage cable, compared to high or very high voltage cable which, amongst others, can be identified as having put a burden on the use of plug-in connectors for the high voltage type cables, whereas it is used for low and medium voltage cables.

Advantages of the high-voltage and very high-voltage plastic cable connector joint according to the present invention with respect to existing fixed cable joints are:

1. much better guarantee of the quality of the connection;
2. making the connection in the field is more man-independent and more rapid;
3. during assembly in the field, no assembly pit or conditioned area is necessary;
4. the installation can be carried out during the cable laying and the connection can still be buried on the same day;
5. the quality of this cable connection is ensured in a manner such that, viewed technically, a voltage test after installation is superfluous;
6. the sleeve insulator is mechanically strongly coupled to the cable conductors, as a result of which correct positioning of the cable ends with respect to the sleeve insulator is better ensured during operation;
7. the total costs of an installed connection according to the invention are lower than embodiments hitherto known as a result of saving in man costs, civil engineering work relating to installation areas, and line surveillance costs, and because the voltage testing after installation is unnecessary;
8. it is possible, in a simple manner, to connect two cables which differ in conductor section and insulation dimensions with a sleeve according to the invention.

The connector parts may be designed as separate mating plug and counter-plug parts or having a coupling part received in the sleeve insulator, forming a mating plug and/or counter-plug part, and can be locked directly to each other or by using a mechanical coupling bush received in the stress-controlling body. The coupling bush may form part of the electrical circuit of the joint by having a central part forming the coupling part of the plug-in connector.

Preferably, the locking means comprise pawl construction means. In the embodiment wherein the plug and counter-plug parts are directly locked, the pawl construction means comprise spring pawls provided in the plug part and recesses for receiving the pawls provided in the counter-plug part. When using a coupling bush, the pawl construction means comprise spring pawls provided in the plug part and in the counter-plug part, and recesses for receiving the pawls provided in the coupling bush. However, other locking means are also possible which employ, for example, a spring clip ring, a groove ring or a Seeger ring.

In the preferred embodiment, the plug part comprises an axial pin and the counter-plug part comprises an axial hole for receiving the pin.

The invention relates, in particular, to a cable-cable connection using a connector joint with which the conductors of at least two high voltage or very high voltage plastic cables are mutually electrically connected, these cables having an earthing screen connected to the electrically conducting sheath of the sleeve insulator.

The invention can, however, also advantageously be used in a cable termination for connecting at least one high voltage or very high voltage plastic cable to at least one through-connection rod of electrically conducting material, for example a connection rod of a high voltage switch, the through-connection rod and the cable conductor having at an end a plug-in connector part.

The stress-controlling body is preferably made from electrically conducting stretchable material, facilitating the stretching of the sleeve insulator, as described hereinafter.

The invention furthermore relates to a method for fabricating a cable-cable connection for high voltage or very high voltage plastic cable using a connector joint, which method has the characteristic that a part of the plug-in connector having locking means is welded to the conductor at an end of each cable, and the earthing screen of each cable is removed over a certain length of the cable end, in that subsequently the cable ends provided with a connector part are each plugged into a passage of the sleeve insulator until locking of the cable ends is brought about, and in that, when at least one cable end is pushed in, the air inside the sleeve insulator is substantially removed, and finally in the connected state of the cables the electrically conducting earthing screen of each cable is connected to the electrically conducting sheath of the joint.

The invention also relates to a method for fabricating a cable-rod connection for the termination of a high voltage or very high voltage cable, using a connector joint, which method has the characteristic that a part of the plug-in connector having locking means is welded to the conductor at an end of a cable and at an end of the through-connection rod to be connected to this cable, and the earthing screen of the cable is removed over a certain length of the cable end, in that the cable end and the through-connection rod are each plugged into a passage of the sleeve insulator until locking is brough about, and in that, when at least the cable end or the end of the through-connection rod provided with a connector part is pushed in, the air inside the sleeve insulator is substantially removed, and finally in the connected state of the cable the electrically conducting earthing screen of the cable is connected to the electrically conducting sheath of the joint.

By forming a channel near a plugged-in cable end between the outside of the sleeve insulator and the space inside the sleeve insulator the air inside it can be sucked out.

By fitting a tube or wire between the surface of the preprocessed cable end and the surface of the passage of the sleeve insulator during the plugging-in of the preprocessed cable end, the air is able to escape from the sleeve. Insertion is then readily possible. After the cable end has been completely plugged in, the tube or the wire is removed.

In connecting a high-voltage plastic cable to an apparatus such as a high-voltage termination, a high-voltage switch or a high-voltage transformer according to the invention, use is made of a prefabricated and electrically inspected elastic apparatus insulator and a preprocessed and electrically inspected cable end.

The invention will be explained in more detail with reference to the drawings.

DETAILED DESCRIPTION OF THE EMBODIMENTS

In the figures, the same reference numerals are used for corresponding components.

Figure 1:
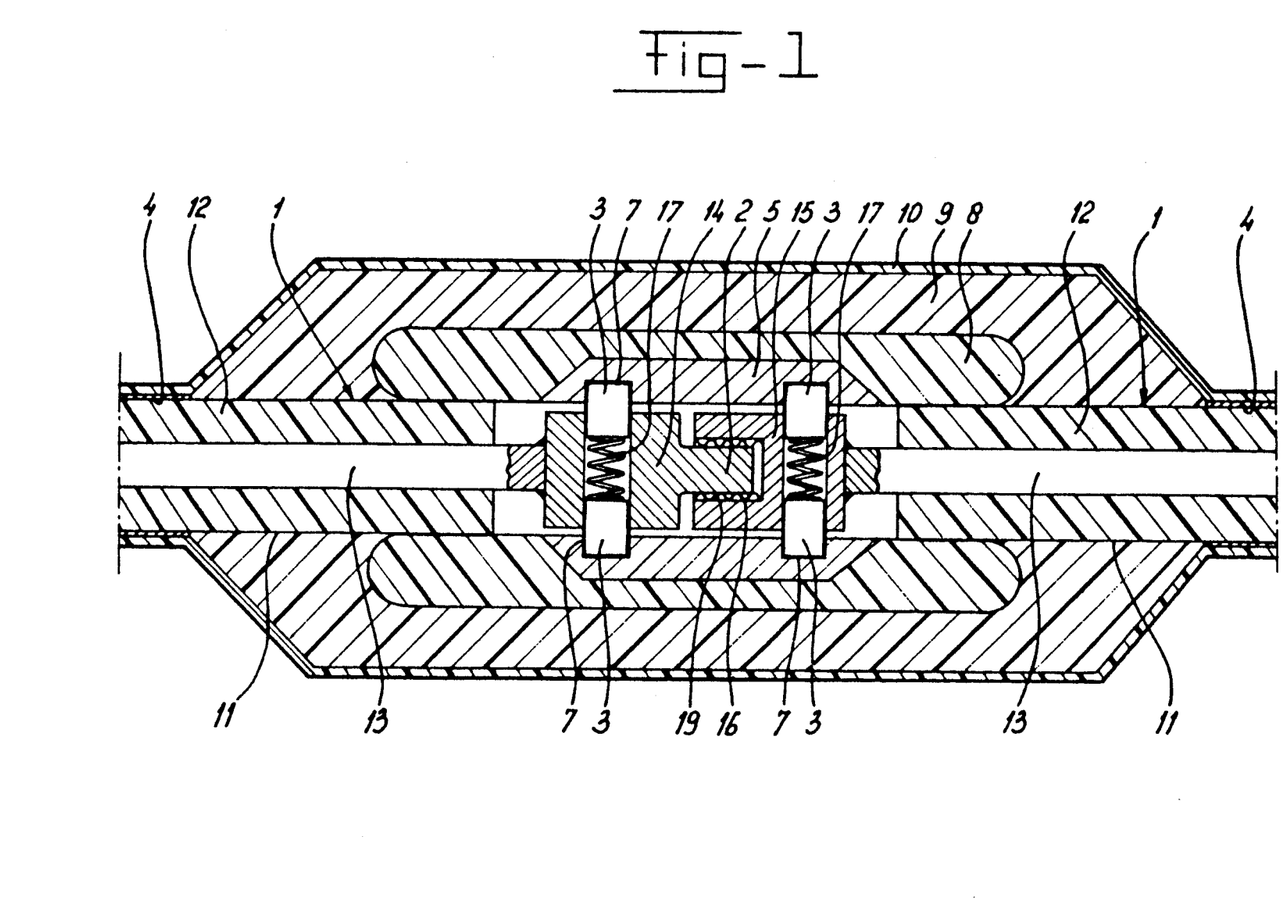
FIG. 1 shows a cross section of a preferred embodiment of the plug-in connection of two high-voltage plastic cables according to the present invention.

The plug-in connection for two high-voltage plastic cables according to FIG. 1 comprises an elastic sleeve insulator with stress-controlling electrically conducting body 8, an insulating body 9 and a conducting sheath 10. Received in the stress-controlling body 8 is a metal coupling bush 5 whose hole is in line with the hole of the stress-controlling body 8 and the insulating body 9, as a result of which a cylindrical cavity is produced through which the cable ends 1 can be pushed as far as the inside of the coupling bush 5. Each cable end 1 is stripped of its earthing screen 4 over a part of its length and of the insulating sheath 12 over a shorter part. A plug part 14 and a counter-plug part 15 are respectively welded to the bared conductors 13. Both plug part 14 and counter-plug part 15 comprise a cylindrical body which fits into the cylindrical cavity inside the coupling bush. The plug part is provided with a projecting pin 2, while the counter-plug part is provided with a hole 16 for receiving the pin 2. Fitted between the pin 2 and the hole 16 are electrically conducting segments 19 for conducting the current. In FIG. 1, the cylindrical bodies of the plug part 14 and the counter-plug part 15 are provided with pawls 3 which can be pressed outwards by a spring 17. In the finished connection between two cable ends according to FIG. 1, the pawls snap into annular recesses 7 in the coupling bush 5. This achieves an electrical connection and a strong mechanical coupling of the cable ends to the sleeve insulator and to each other. In the method for connecting two high-voltage plastic cables, after the cable insulation 12 has been removed over a short length, a plug pin part 14 or a counter-plug part 15 is welded to the conductor 1 of the two cable ends and the extruded earthing screen 4 is removed from the cable over a certain length of the cable end. Then one of the cable ends thus prepared in advance is inserted into the passage 11 of the sleeve insulator until the pawls 3 are pressed into the respective recess 7 of the coupling bush. The cable conductor is then electrically and mechanically connected to coupling bush 5 and the cable end is positioned with an accuracy of ±1 mm with respect to the sleeve insulator.

For a good insulation level of the cylindrical contact surface between cable and sleeve insulator, it is necessary for the diameter of the cable end plugged in, from which the earthing screen 4 has been removed, to be greater than the inside diameter of the passage 11 of the sleeve insulator so that, when the cable end is plugged into the sleeve insulator, the sleeve insulator stretches a little and lies as a close fit against the processed cable end. As a result of this close fitting, however, when the second cable end is plugged in, the air in the passage 11 is trapped and, without special measures, the air will build up an obstructive counter pressure if the cable end is moved further in the direction of the centre of the sleeve insulator.

Figure 10:
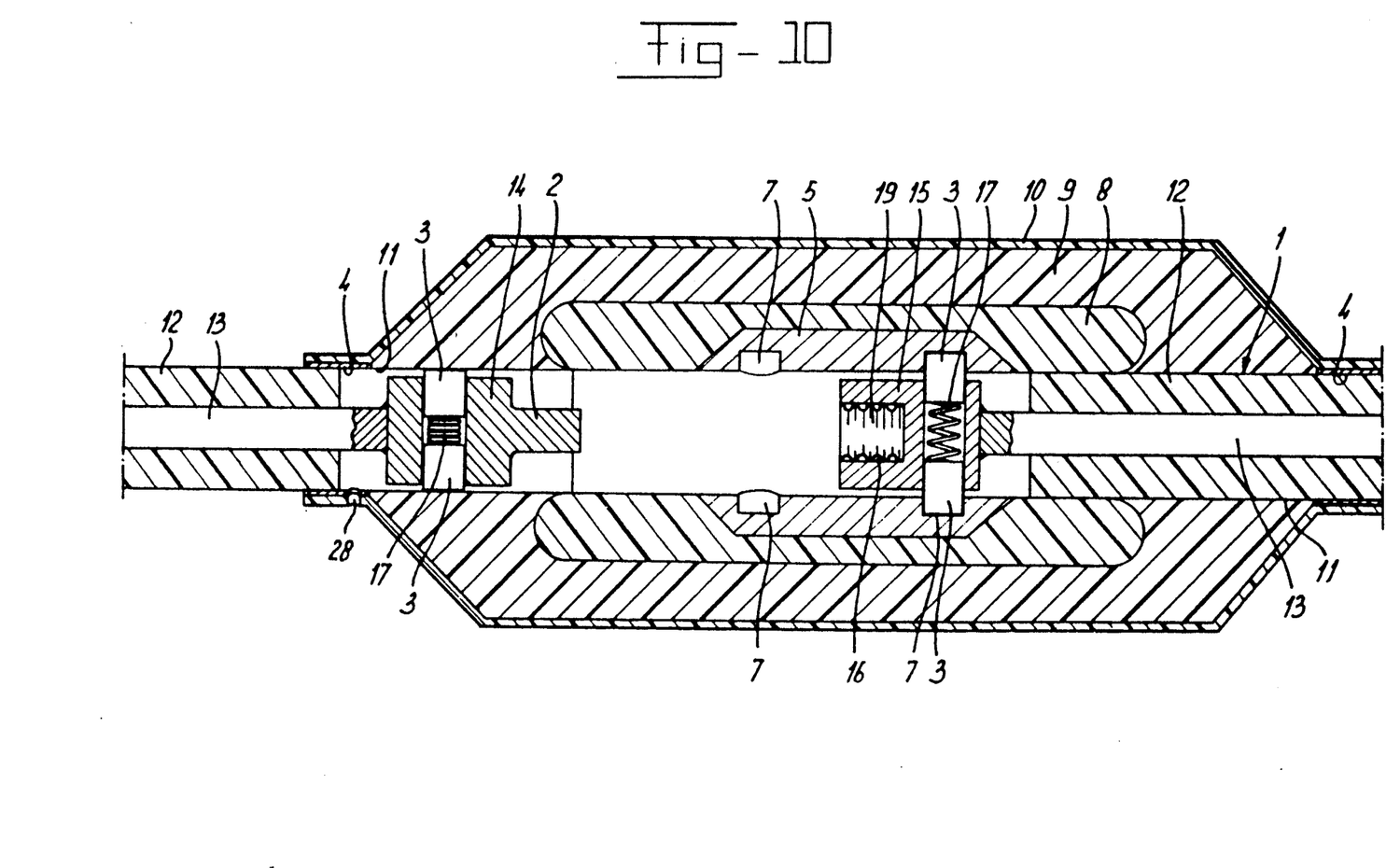
FIG. 10 is a view similar to FIG. 1 showing a plug-in connector before plugging in with an air-venting passage or channel.

According to a method of the present invention, the second cable end is now plugged in so far that 1 to 2 cm of the cable insulation is situated in the passage of the sleeve insulator. As a result of this the cable passage is sealed off from the outside air. By means of a channel in the conducting sleeve of the sleeve insulator, which channel extends from the outside to the cylindrical space, and a vacuum supply, the air in the sealed passage is sucked out and the cable end is plugged in further until the pawls 3 of the plug part are pressed into the recess intended therefor.

Figure 9:
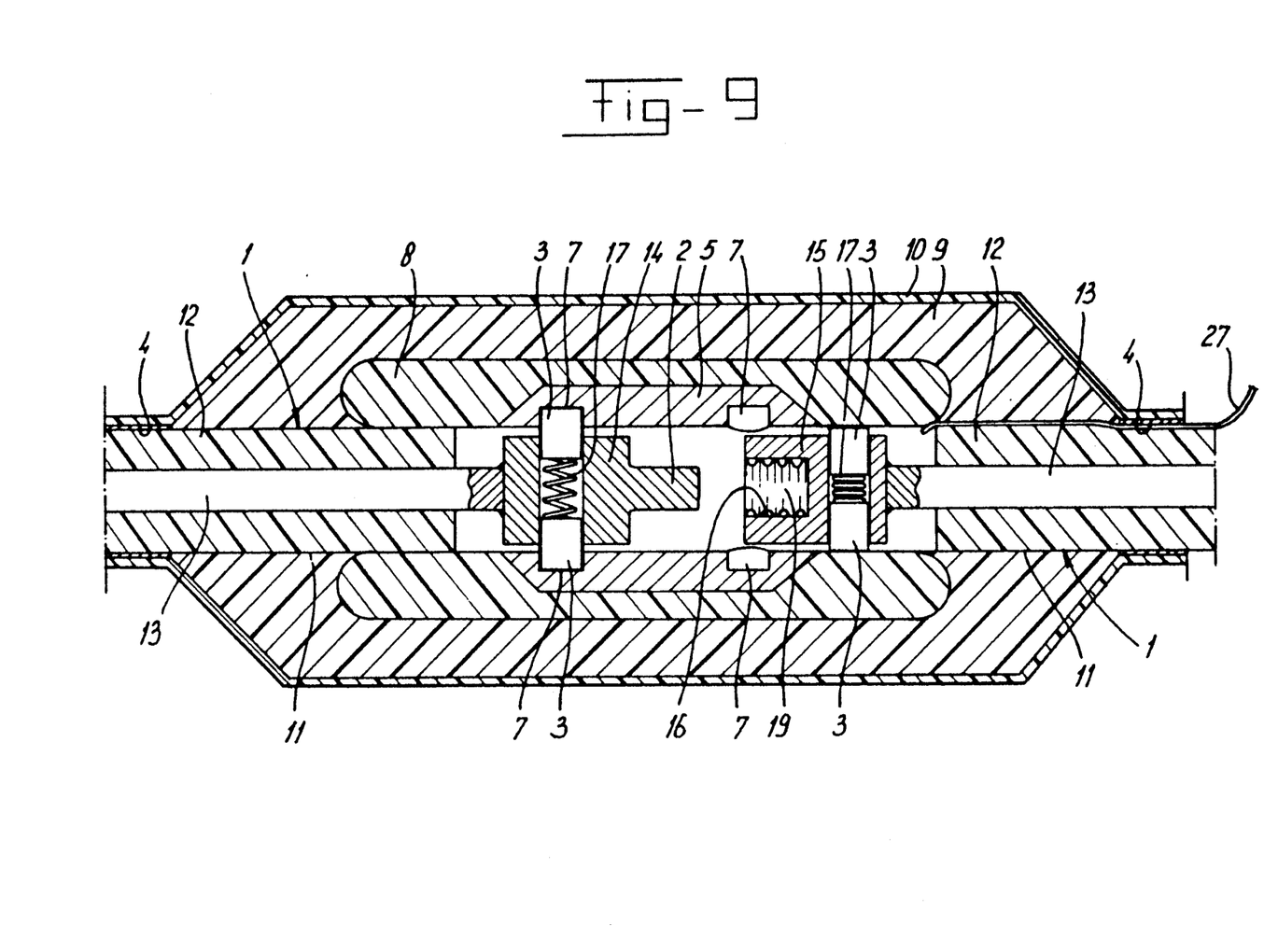
FIG. 9 is a view similar to FIG. 1, showing a plug-in connector before plugging in with an air-venting insert.

According to another method embodiment of the present invention, before plugging in the second cable end a tube or wire is inserted along the inner wall of the sleeve, such that the tube or wire extends from the coupling bush externally of the sleeve. When the second cable end subsequently is plugged in, a channel is formed releasing trapped air to the outside. Using a tube, the air-release channel is comprised by the tube's hollow interior wire, the resilient sleeve is pushed aside creating interstices along either side of the wire. When plugging in the cable, compressed air can escape to the outside through the channel formed by the interstice. When the pawls are pressed into the recesses intended therefor, the tube or wire is then withdrawn from the sleeve. As a result of this, the second cable end is also electrically and mechanically precisely connected to the coupling bush and a current-conducting connection between the two conductors of the cable ends is brought about because, at the same time, the plug part is plugged into the counter-plug part.

After this, the conducting sheath of the sleeve insulator 10 is connected in an electrically conducting manner to the earthing screen 4 of the two cables. After the metal earthing screens of the two cables have been connected, the moisture-repellent and mechanical protection layers are provided over the sleeve insulator with metal earthing screen connection.

The plugging-in of the preprocessed cable ends lasts approximately 30 minutes. The plug-in connection and the method according to the present invention have now been carried out a few times with a prototype of a sleeve insulator, followed by the standard type-approval tests, which have been successfully passed.

The advantages of a plug-in connection are also achieved with connections of which a section is shown in FIG. 2, FIG. 3, FIG. 4, FIG. 5 and FIG. 6 and in which the method described above is also used.

Figure 2:
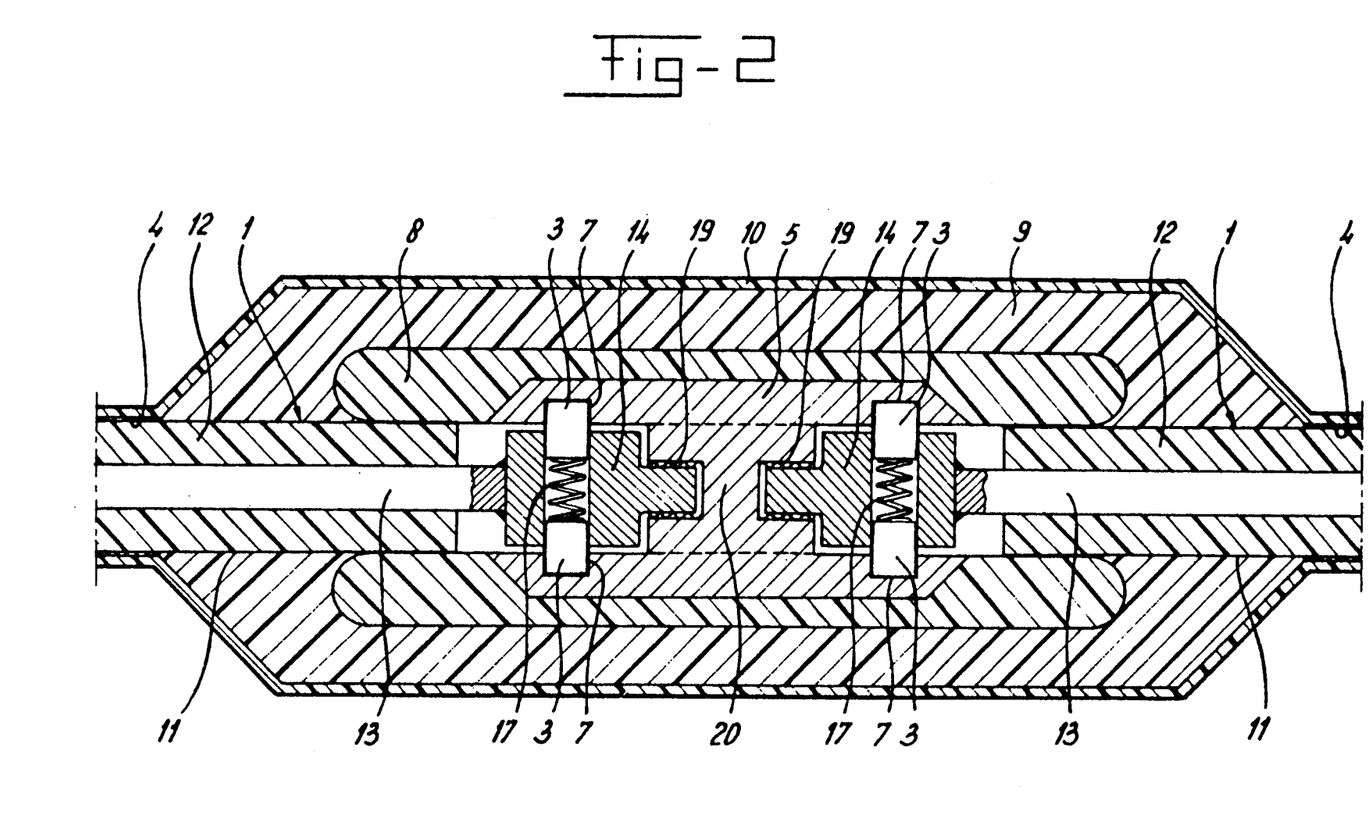
FIGS. 2 and 3 are cross sections of other preferred embodiments of the connection of two high-voltage plastic cables according to the present invention having a closed coupling bush in the centre.
Figure 3:
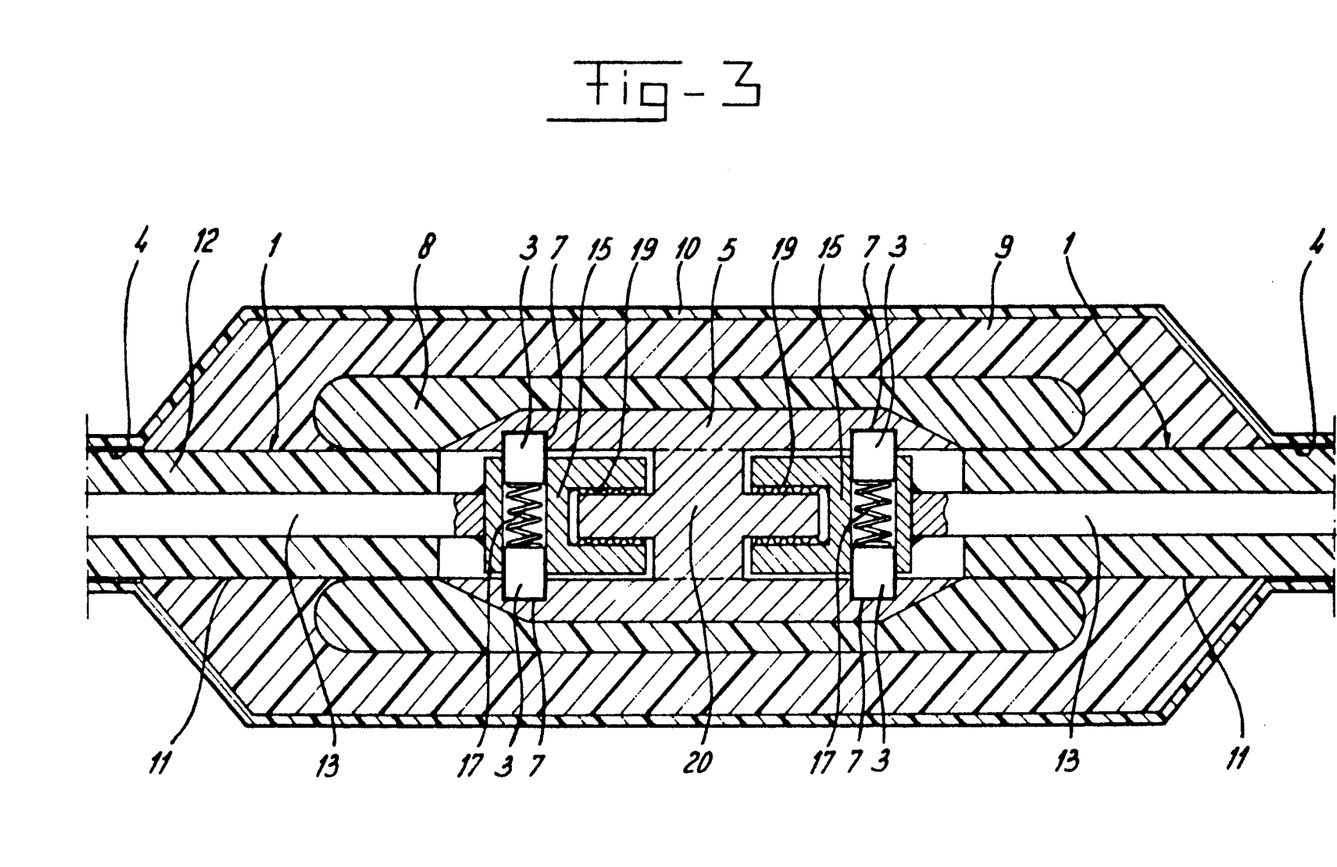

In FIGS. 2 and 3, a central middle part 20 of the coupling bush 5 is used which seals the sleeve insulator in the centre. Each cable end is now provided with a plug part 14 in the embodiment according to FIG. 2 and a counter-plug part 15 in the embodiment according to FIG. 3.

Figure 4:
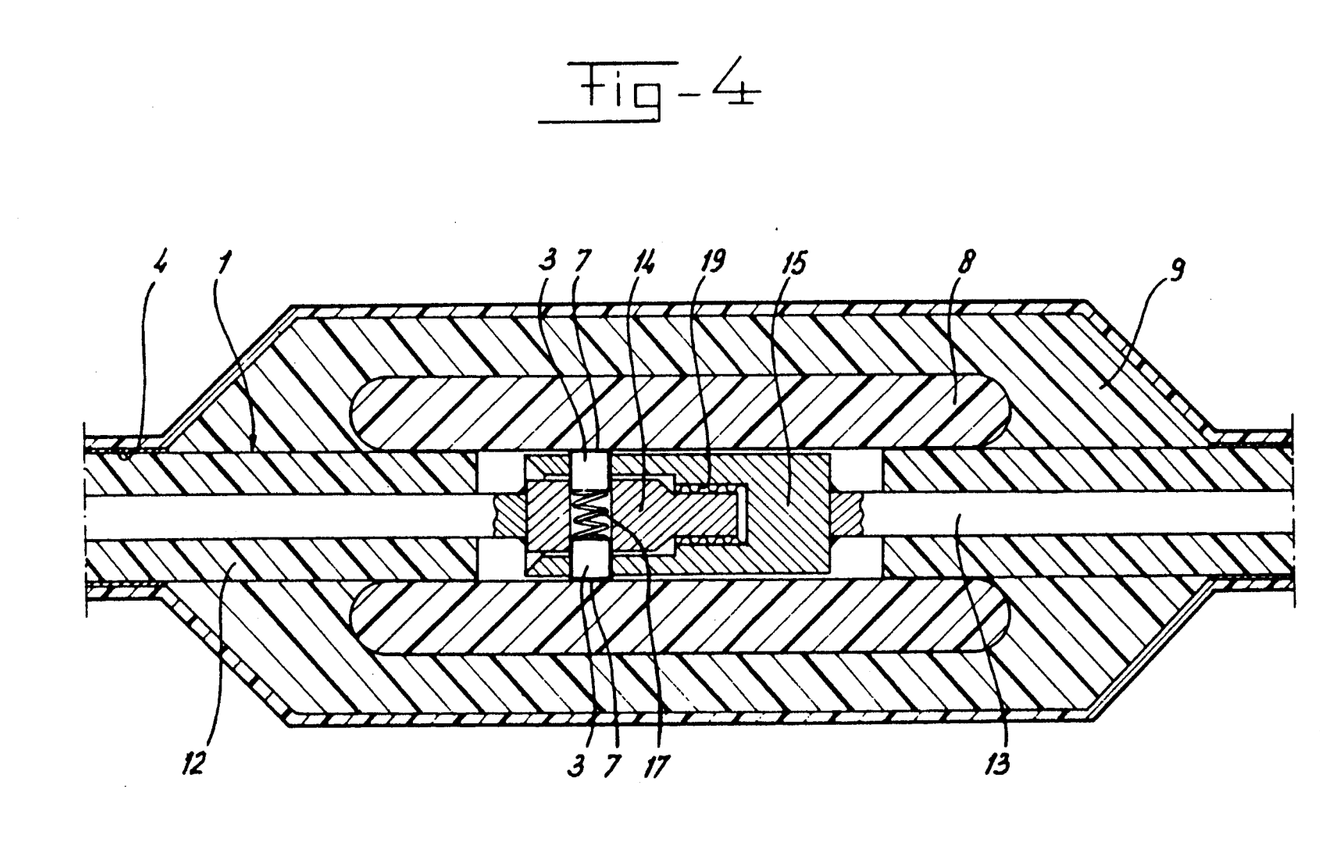
FIG. 4 shows a cross section of another embodiment of the connection of two high-voltage plastic cables according to the present invention without using a coupling bush.

In the embodiment according to FIG. 4 no electrically conducting coupling bush is used. The plug part 14 is locked to the counter-plug part 15 with the aid of a pawl construction in which the pawls 3 and the spring 17 are situated in the plug part, while the counter-plug part is provided in this case with recesses 7 for receiving the pawls. This pawl construction is fitted in a thickened part of the plug pin so that the current passage is not disturbed at the segments 19.

Obviously the present invention is not, however, limited to the embodiments shown in FIGS. 1 to 4 inclusively.

Figure 5:
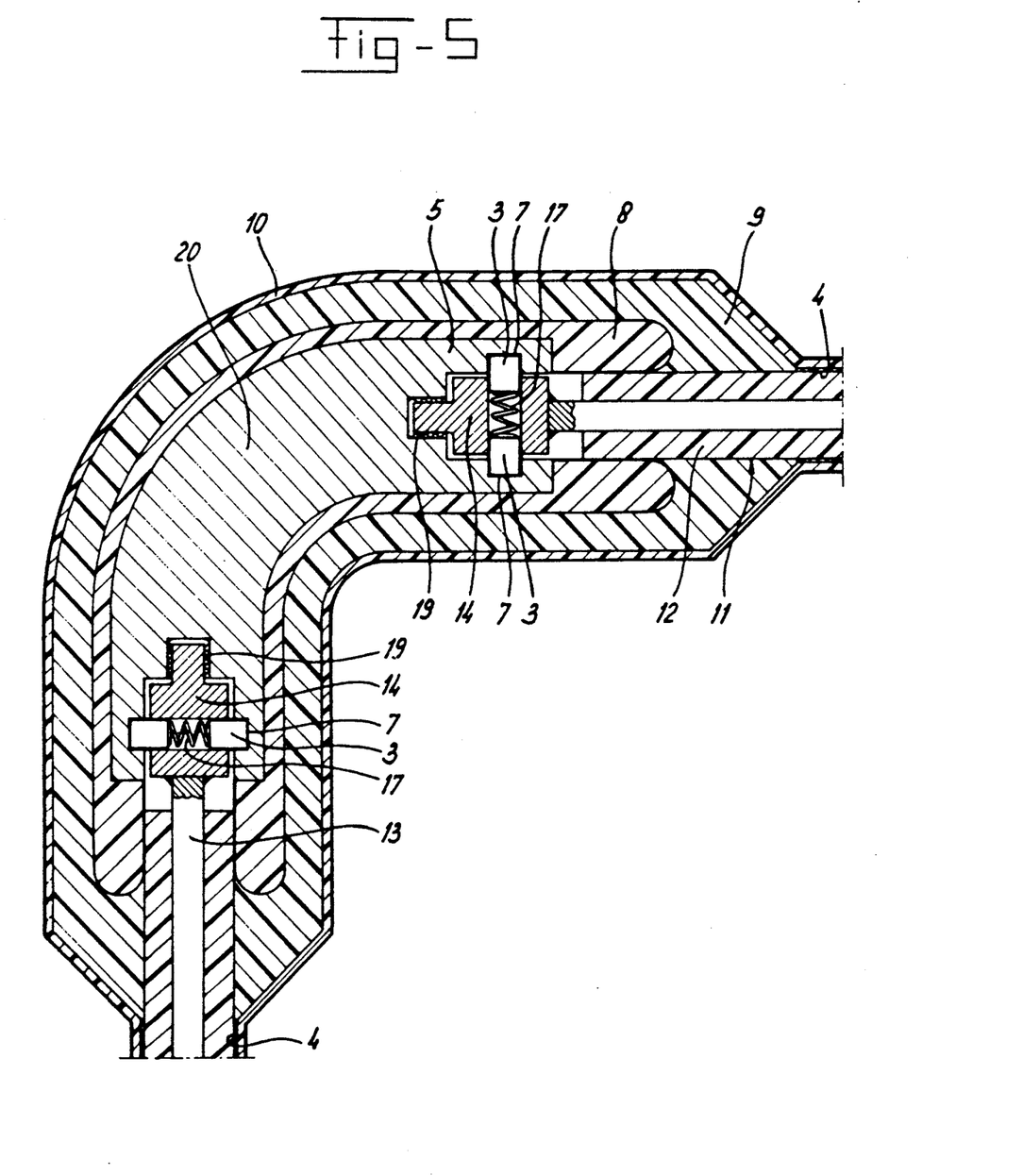
FIG. 5 shows a cross-section of a right-angled embodiment of the connection of two high-voltage plastic cables according to the present invention.
Figure 6:
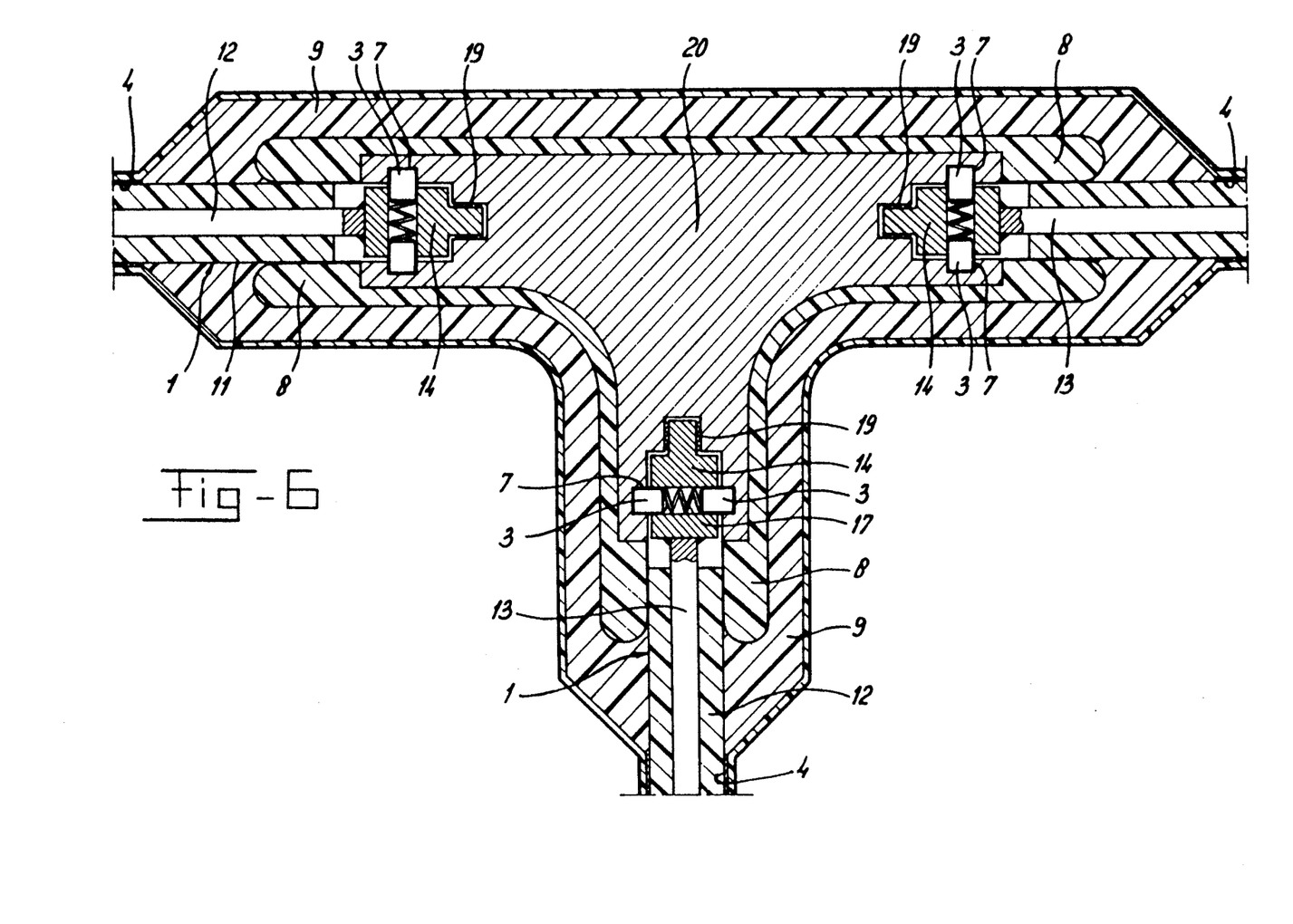
FIG. 6 shows a cross section of a right-angled embodiment of the connection of three high-voltage plastic cables according to the present invention.

FIG. 5 shows a sleeve insulator according to the present invention with which a right-angled connection can be brought about. Here, again, the coupling bush 5 is provided with a closed middle part 20 as in the embodiments according to FIGS. 2 and 3. This right-angled connection according to FIG. 5 has the important advantage that use of high-voltage cables is possible in limited spaces. Space-requiring cable bends can hereby be avoided. Angles other than the right-angled connection according to FIG. 5 are also obviously possible.

A number of important advantages can also be obtained by using the connections, of which the cross sections are given in FIGS. 1 to 4 inclusively, with another method. In this case the method is as follows. A sleeve insulator in the stretched state is pushed over one of the cables. Then the electrical and mechanical coupling between the cable ends is brought about with appropriate means. If it has a space in the stress-controlling body 8 for the coupling bush 5, the sleeve insulator is then brought to the correct position around the coupled ends and the means with which the sleeve insulator has been stretched are removed. After that, the sleeve insulator fits closely onto the processed cable ends and the coupling bush 5, and the connection according to FIG. 1, FIG. 2, FIG. 3 or FIG. 4 is achieved. It is also possible to push the sleeve insulator onto the conducting earthing screen 4 of the cable end. For this purpose, external layers of the cable are removed over an additional length equal to a little more than the insulator length. In the preprepared cable ends, with or without a coupling bush 5 placed in the stress-controlling body 8, are plugged into each other. Then the sleeve insulator is brought into the correct position with respect to the coupled cable ends by sliding the sleeve insulator. The insulated connection is hereby brought about.

Figure 7:
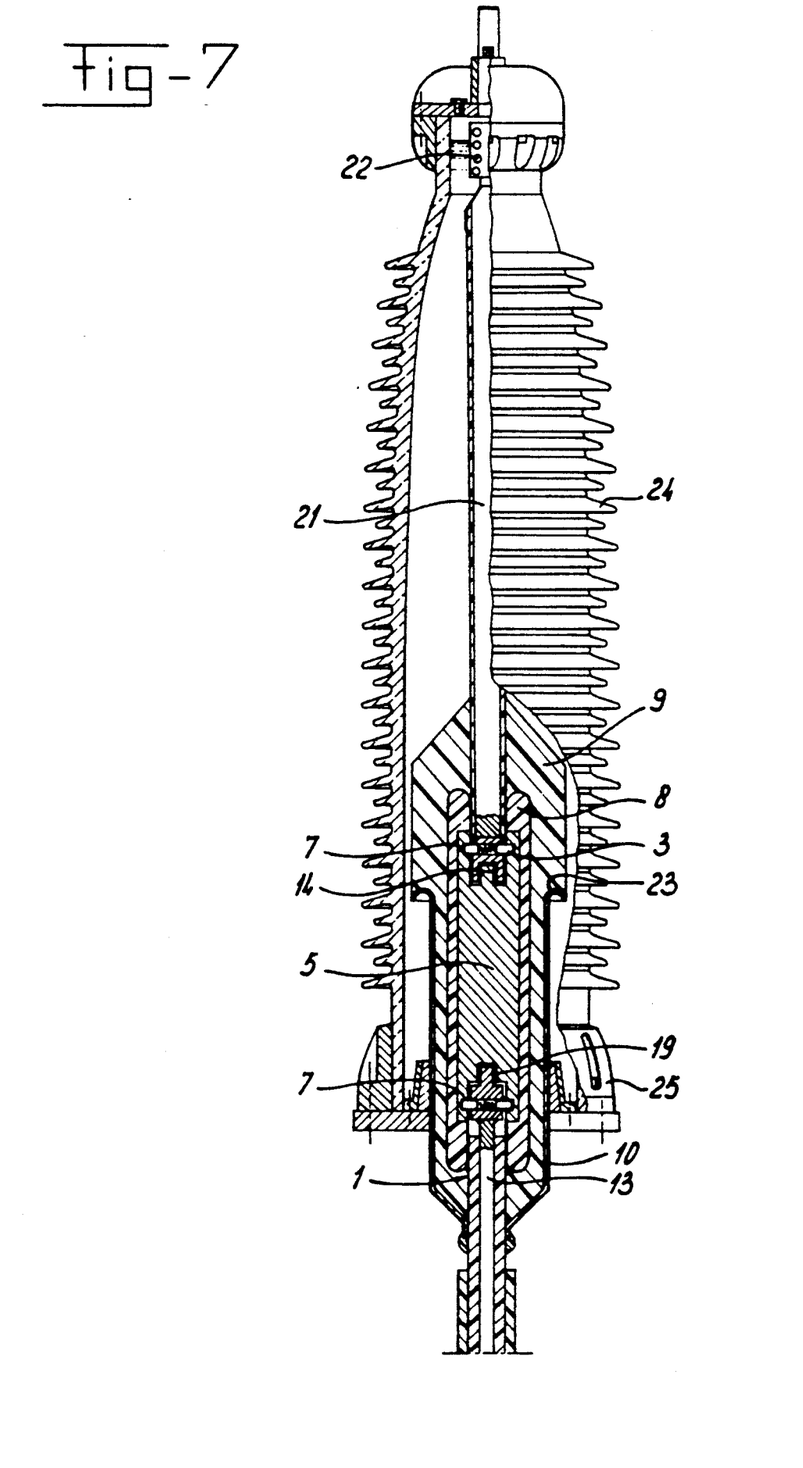
FIG. 7 shows a cross section of a preferred embodiment of a connection of a high-voltage plastic cable to a high-voltage termination according to the present invention.

FIG. 7 shows a cross section of the plug-in connection for a high-voltage plastic cable in a high-voltage outside termination. An elastic sleeve insulator is assembled in a mechanically strong and leak-tight manner on a metal foot plate 25 in a ground plate of the outside termination. At the side where the cable is plugged in, the elastic sleeve insulator is identical to the sleeve insulator for connecting two high-voltage plastic cables according to FIGS. 1-5. At the termination side, the shape of the insulating body 9 is different and a part of the insulating body 9 is not provided with the conducting sheath 10. The end of the conducting sheath 10 is rounded off at 23. At this point, the diameter of the insulating body 9 is greater. This rounding 23 at the end of the conducting sheath 10, and the thickness and the length and conical shape of the insulating body 9 at the termination side are dimensioned at the required insulation level of the termination structure.

The connection-rod 21 of the termination insulator to the top 22 of the termination and the preprocessed cable end 1 are plugged in in the same manner as in the connection of two high-voltage cables as described above. It is also possible to test the complete termination, with porcelain insulator 24 and filling medium, with high voltage before delivery. The same quality assurance level is hereby achieved as in the connection of two high-voltage plastic cables according to the invention.

Figure 8:
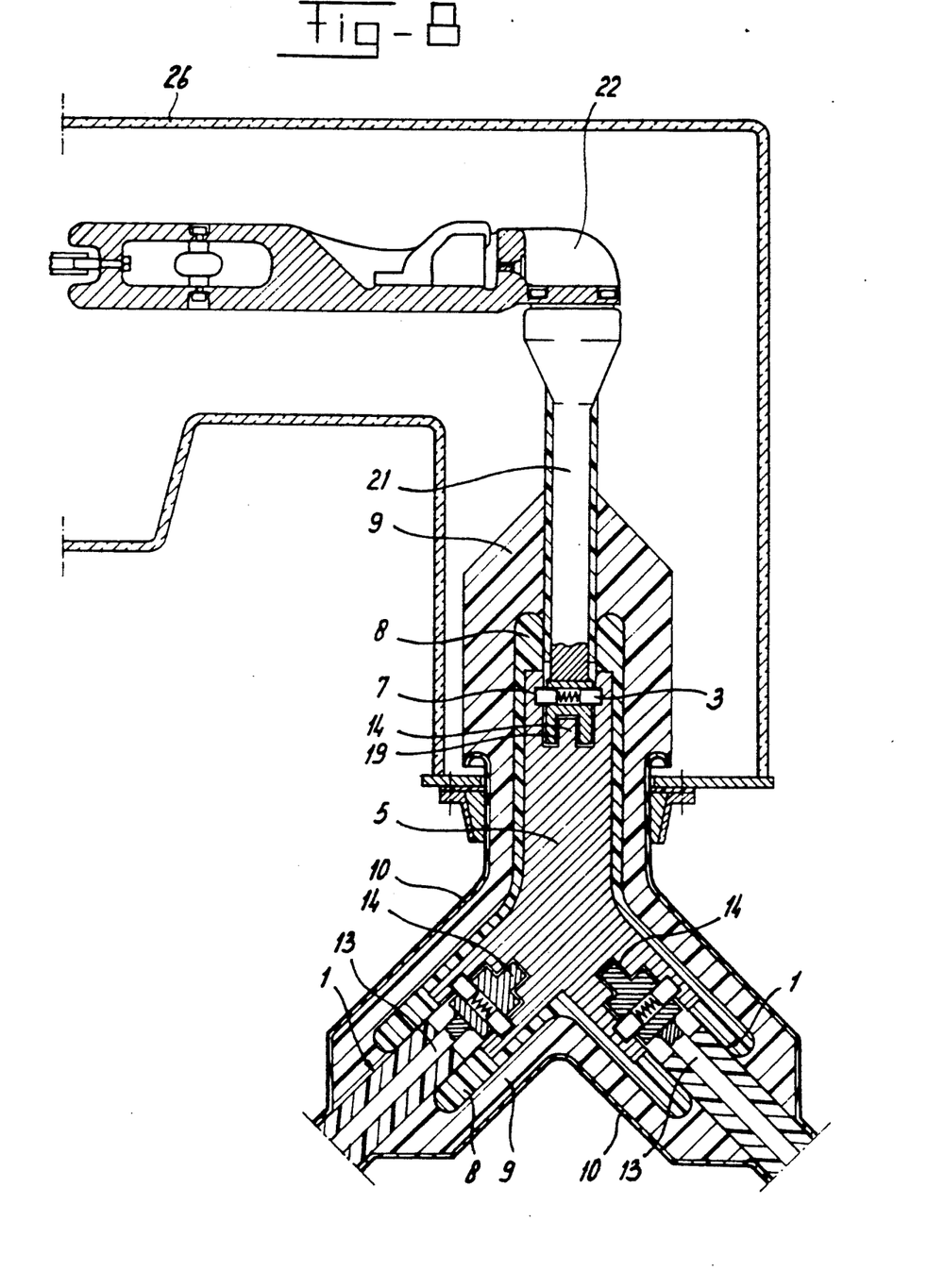
FIG. 8 shows a cross section of an embodiment of the connection of a high-voltage plastic cable to a high-voltage switch or high-voltage transformer according to the invention, two plugged-in cables being assembled at an arbitrarily chosen angle to the centre line of the apparatus.

FIG. 8 shows a section of a plug-in connection for two high-voltage plastic cables in a diagrammatically shown high-voltage switch 26. The elastic insulator is assembled in a mechanically strong and leak-tight manner on the footplate 27 of the diagrammatically shown switch compartment 26. The shape of the elastic insulator is in principle the same as the elastic insulator which is used in the outside termination of FIG. 7. However, the insulator in FIG. 8 is constructed in a manner such that two cables 1 can be plugged in at an angle to the axis of the breaker tank, and in practice this may be space- and cost-saving. The end pieces of the insulator are of identical construction as in the case of the insulator for the outside termination.

With the double construction of the cable connection to the insulator, it is possible to operate a doubly constructed cable connection via a single switch and a tapping at high-voltage level can then easily be made for any purpose whatsoever.

Figure 9A:
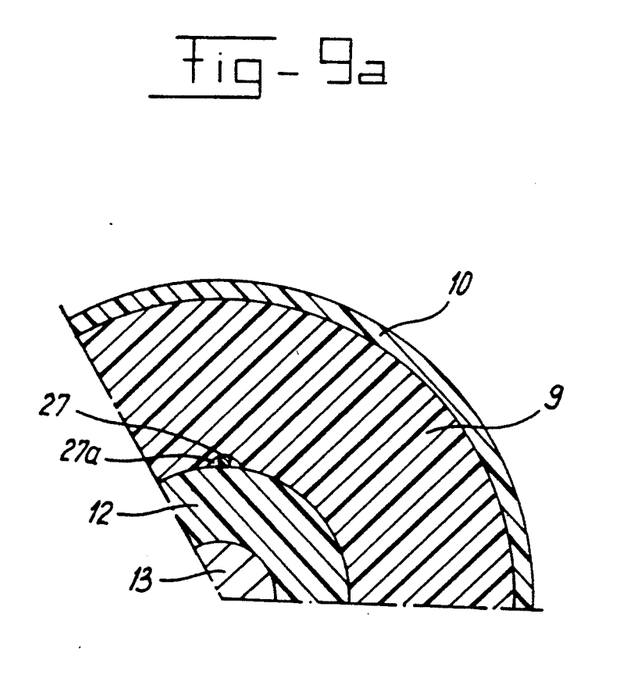
FIG. 9a is an enlarged cross-sectional detail of FIG. 9.

In FIG. 9, reference numeral 27 denotes a wire or tube serving as an air-venting insert. Because of the stiffness of the insulating body 9, this body will not surround a wire closely, as schematically indicated in FIG. 9a. Adjacent the wire, air channels 27a arise, via which channels, air inside the sleeve can be released.

This insulator is also tested with high voltage before delivery and the cable ends and connection rod to the current-carrying parts of the switch are plugged in using the method according to the invention.

I claim:

1. A high-voltage, plastic-insulated cable joint for field assembly to a high-voltage cable termination of a cable end of a stiff, heavy, solid-insulated, high-voltage cable rated for voltages in excess of about 50 kV and having an insulated conductor surrounded with a plastic insulation sheath, said high-voltage termination having a second conductor and also being rated for voltages in excess of 50 kV, said cable joint comprising:

a) at least two pluggable conductor-connecting elements one for said cable end and one for said cable termination;
b) an elastic, stretchable electrical sleeve insulator having:
   i) an electrically conducting, annular, stress-controlling body defining an interior, open-ended, connection chamber for said conductor-connecting elements, said connection chamber having opposed open ends, said stress-controlling body being operative to screen conductor-connecting elements received in said connection chamber through said open ends; and
   ii) an annular insulating body surrounding said stress-controlling body and having first and second insulator body passages opening into said connection chamber open ends, said insulator body passages each making a substantially airtight close-sliding fit with said insulated first conductor and said second conductor, respectively, whereby said conductors fitted with said conductor-connecting elements can be received through said insulator body passages into said connection chamber;
   said sleeve insulator being field assemblage with said cable end and said cable termination; and
   iii) air-venting means to remove air from said connection chamber during assembly of said cable joint;
wherein said conductor-connecting elements include a self-locking mechanism actuatable in said connection chamber by relative movement of said cable end toward said cable termination mechanically to lock said cable end in position with respect to said cable termination.

2. A joint according to claim 1, wherein said conductor-connecting elements comprise separate mating plug and counter-plug parts.

3. A joint according to claim 1, wherein said self-locking mechanism comprises an interengageable plug part and a counter-plug part.

4. A joint according to claim 1, comprising a mechanical coupling bush received in said stress-controlling body, wherein said self-locking mechanism comprises a mating plug and counter-plug parts engageable with said coupling bush.

5. A joint according to claim 1, comprising a central part of electrically conducting material in said connection chamber, said central part forming a coupling part of said conductor-connecting elements.

6. A joint according to claim 5, wherein said central part forms a mating counter-plug part for each said pluggable conductor-connecting element.

7. A joint according to claim 4, comprising a central part of electrically conducting material in said connection chamber said central part forming a coupling part of said conductor connecting elements, and forming a whole with said coupling bush.

8. A joint according to claim 1, wherein said conductor-connecting elements comprise an axial pin and an axial hole for receiving said pin.

9. A joint according to claim 1, wherein said self-locking mechanism comprises spring pawl construction means.

10. A joint according to claim 3, wherein said at least two conductor-connecting elements are interengageable and said self-locking mechanism comprises spring pawl construction means, having spring pawls provided on one said conductor-connecting element and recesses for receiving the pawls provided on the other said conductor-connecting element.

11. A joint according to claim 4, wherein said self-locking mechanism comprise spring pawl construction means, having spring pawls provided on said conductor-connecting elements, and recesses for receiving said pawls, provided in said coupling bush.

12. A joint according to claim 6, wherein said self-locking mechanism comprise spring pawl construction means, having spring pawls provided on each said conductor-connecting element and recesses for receiving said pawls provided in said coupling bush.

13. A joint according to claim 1, wherein said sleeve insulator close-fitting passages are situated in line with one another.

14. A joint according to claim 1, comprising a central part of electrically conducting material in, said connection chamber, said central part forming a coupling part of said conductor-connecting elements, wherein said sleeve insulator passages are at an arbitrary angle with respect to one another, said sleeve insulator being shaped according to said angle.

15. A joint according to claim 1, having an electrically conducting stretchable stress-controlling body.

16. A cable-to-cable connection comprising a joint according to claim 1, wherein said cable termination is comprised by a second cable end similar to the first said cable end, said cables having an earthing screen connected to an electrically conducting sheath around said sleeve insulator.

17. A cable termination having a joint according to claim 1 for connecting at least one cable to at least one through-connection rod of electrically conducting material, said through-connection rod and the cable conductor having at an end a plug-in connector part.

18. A cable-rod connection using a cable termination according to claim 17, wherein the conductor of at least one cable is electrically connected to at least one through-connection rod of electrically conducting material, said at least one cable having an earthing screen connected to the electrically conducting sheath of the sleeve insulator.

19. A joint according to claim 1 wherein said plastic-insulated cable has a weight of at least 25 kg/m.

20. A joint according to claim 1 comprising an electrically conducting sheath completely or partially surrounding said insulating body for connection with a conductive sheath around said cable insulation.

21. A joint according to claim 1 wherein said cable termination comprises a second cable end similar to the first said cable end.

22. A joint according to claim 1 wherein said cable insulator body comprises a venting passage near at least one end of said insulator body, said venting passage communicating with said connection chamber for the evacuation of fair therefrom with a cable end partially inserted in said insulator body and being closed off by a fully inserted cable end.

23. A joint according to claim 1 including a removable elongated insert insertable along said cable end into said connection chamber, to permit release of air from said chamber, said insert being removable after locking of said self-locking mechanism.

24. A method for fabricating a high-voltage, plastic-insulated cable joint for making an electrical connection between at least two cable ends of stiff, heavy, solid-insulated high-voltage cables rated for voltages in excess of about 50 kV, each said cable comprising an insulated conductor surrounded with a plastic insulation sheath and an earthing screen surrounding said plastic insulation sheath, said method comprising:

a) removing said screening from each said cable end to expose said insulation sheath;

b) welding a pluggable, conductor-connecting element to each said cable end;

c) field assembly of said cable ends to a cable joint, said cable joint comprising an elastic, stretchable electrical sleeve insulator and an external earthing screen around said insulator, said insulator having:

i) an electrically conducting, annular, stress-controlling body defining an interior, open-ended, connection chamber for said conductor-connecting elements, said connection chamber having opposed open ends, said stress-controlling body being operative to screen conductor-connecting elements received in said connection chamber through said open ends; and ii) an annular insulating body surrounding said stress-controlling body and having first and second insulator body passages opening into said connection chamber open ends, said insulator body passages each making a substantially airtight, close-sliding fit with said screen-removed insulated cable ends;

said assembly being effected by inserting said screen-removed cable ends, provided with pluggable conductor-connecting elements, into said insulator body passages;

d) providing a self-locking mechanism to lock said cable ends in fixed relative positions in said cable joint;

e) advancing said cable ends toward one another within said connection chamber to actuate said self-locking mechanism to lock said cable ends in fixed relative positions and make said electrical connection;

f) venting air from said connection chamber during insertion of said cable ends into said insulator body passages; and g) connecting said cable earthing screens to said cable joint earthing screen.

25. A method according to claim 24, wherein said cable joint has a coupling bush within said insulator body said coupling bush being separately lockable with said at least two conductor-connecting elements by engagement therewith, wherein one of said cable ends provided with a conductor-connecting element is plugged into said passage of said sleeve insulator until locking is effected, and said other cable end provided with a connector part is plugged into said other passage of said sleeve insulator until locking is effected.

26. A method according to claim 24, wherein a channel is formed near an inserted cable end between the outside of said sleeve insulator and said connection chamber inside said sleeve insulator, and wherein, via said channel, air inside said sleeve insulator is substantially evacuated said cable end then being fed into said sleeve insulator.

27. A method according to claim 24, wherein, an elongated, air-vent-forming insert is brought into said connection chamber and said air-vent-forming insert projects outside said sleeve insulator whereby when said at least two cable ends provided with conductor-connecting parts are inserted into said sleeve-insulator, air in said connection chamber is substantially removed along or through said air-vent-forming insert.

28. A method for fabricating a cable-to-conductor rod high-voltage, plastic-insulated cable joint to make an electrical connection between a cable end and a cable terminator, said cable end being of stiff, heavy, solid-insulated high-voltage cables rated for voltages in excess of about 50 kV, said cable comprising an insulated conductor surrounded with a plastic insulation sheath and an earthing screen surrounding said plastic insulation sheath, and said cable terminator being also rated for voltages in excess of about 50 kV and having a conductor rod for connection to said insulated conductor said method comprising:

a) removing said screening from said cable end to expose said insulation sheath;

b) welding at least two pluggable, conductor-connecting elements, one to said cable end and one to said conductor rod;

c) assembly of said cable end and conductor rod to a cable joint, said cable joint comprising an elastic, stretchable electrical sleeve insulator and an external earthing screen around said insulator, said insulator having:

i) an electrically conducting, annular, stress-controlling body defining an interior, open-ended, connection chamber for said conductor-connecting elements, said connection chamber having opposed open ends, said stress-controlling body being operative to screen conductor-connecting elements received in said connection chamber through said open ends; and ii) an annular insulating body surrounding said stress-controlling body and having first and second insulator body passages opening into said connection chamber open ends, said insulator body passages each making a substantially airtight, close-sliding fit with said screen-removed insulated cable end and said conductor rod;

said assembly being effected by inserting said screen-removed cable end and said conductor rod, each provided with a pluggable conductor-connecting element, into said insulator body passages;

d) providing a self-locking mechanism to lock said cable end and said conductor rod in fixed relative positions in said cable joint;

e) advancing said cable end and said conductor rod toward one another within said connection chamber to actuate said self-locking mechanism to lock said cable end and conductor rod in fixed relative positions and make said electrical connection;

f) venting air from said connection chamber during insertion of said cable end and said conductor into said insulator body passages; and g) connecting said cable earthing screen to said cable joint earthing screen.

29. A method according to claim 28, wherein said cable joint has a coupling bush within said insulator body said coupling bush being separately lockable with said at least two conductor-connecting elements by engagement therewith, wherein said conductor rod provided with a conductor-connecting element is plugged into a passage of said sleeve insulator until locking is effected and at least one said cable end provided with a conductor-connecting is plugged into said other passage of said sleeve insulator until locking is effected.

30. A method according to claim 28, wherein a channel is formed near an end of said sleeve insulator between the outside of said sleeve insulator and wherein, via said channel, air inside said sleeve insulator is substantially evacuated said cable end then being fed into said sleeve insulator.

31. A method according to claim 28, wherein, an air-vent-forming insert is brought into said connection chamber and said air-vent-forming insert projects outside said sleeve insulator whereby when said cable end is inserted into said sleeve-insulator, air in said connection chamber is substantially removed along or through said air-vent-forming insert.

32. A method for fabricating a high-voltage, plastic-insulated cable joint for making an electrical connection between at least two cable ends of stiff, heavy, solid-insulated high-voltage cables rated for voltages in excess of about 50 kV, each said cable comprising an insulated conductor surrounded with a plastic insulation sheath and an earthing screen surrounding said plastic insulation sheath, said method comprising:
- a) removing said screening from each said cable end to expose said insulation sheath;
- b) welding a pluggable, conductor-connecting element to each said cable end, said conductor-connecting elements being interengageable to lock said cable ends in fixed relative positions;
- c) field assembly of said cable ends to a cable joint, said cable joint comprising an elastic, stretchable electrical sleeve insulator and an external earthing screen around said insulator, said insulator having:
  - i) an electrically conducting, annular, stress-controlling body defining an interior, open-ended, connection chamber for said conductor-connecting elements, said connection chamber having opposed open ends, said stress-controlling body being operative to screen conductor-connecting elements received in said connection chamber through said open ends; and
  - ii) an annular insulating body surrounding said stress-controlling body and having first and second insulator body passages opening into said connection chamber open ends, said insulator body passages each making a substantially airtight, close-sliding fit with said screen-removed insulated cable ends;
- d) providing a self-locking mechanism to lock said cable ends in fixed relative positions in said cable joint;
- e) advancing said annular insulator body over one said cable end to expose one said pluggable conductor-connecting element for connection to said other conductor-connecting element;
- f) interengaging said conductor-connecting elements to lock said cable ends in fixed relative positions;
- g) retracting said annular insulator body over said locked cable ends with insertion of said other cable end into said insulator body to seal said connection chamber; and
- h) connecting said cable earthing screens to said cable joint earthing screen;

including making an electrical connection between said conductors during fabrication of said joint.

* * * * *